US008683078B2

(12) United States Patent
Song et al.

(10) Patent No.: US 8,683,078 B2
(45) Date of Patent: Mar. 25, 2014

(54) METHOD AND SYSTEM FOR QUALITY OF SERVICE CONTROL FOR REMOTE ACCESS TO UNIVERSAL PLUG AND PLAY

(75) Inventors: Yu Song, Pleasanton, CA (US); Doreen Cheng, San Jose, CA (US); Alan Messer, Los Gatos, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1567 days.

(21) Appl. No.: 11/713,521

(22) Filed: Mar. 1, 2007

(65) Prior Publication Data

US 2007/0211632 A1 Sep. 13, 2007

Related U.S. Application Data

(60) Provisional application No. 60/780,104, filed on Mar. 7, 2006.

(51) Int. Cl.
*G06F 15/16* (2006.01)

(52) U.S. Cl.
USPC .......................................... 709/249

(58) Field of Classification Search
USPC .......................................... 709/249
See application file for complete search history.

(56) References Cited

U.S. PATENT DOCUMENTS

| 7,403,504 | B2 | 7/2008 | Sawabe et al. |
| 2005/0213502 | A1 | 9/2005 | Convertino et al. |
| 2006/0143295 | A1* | 6/2006 | Costa-Requena et al. .... 709/227 |
| 2006/0189322 | A1 | 8/2006 | Conte et al. |
| 2006/0242315 | A1 | 10/2006 | Nichols |
| 2007/0162165 | A1* | 7/2007 | Stirbu et al. ...................... 700/65 |
| 2007/0211631 | A1 | 9/2007 | Rahman et al. |
| 2008/0219176 | A1 | 9/2008 | Yamada |
| 2008/0259031 | A1 | 10/2008 | Yoshino |
| 2009/0138596 | A1 | 5/2009 | Song |

OTHER PUBLICATIONS

Song, A. et al., "UPnP QoS 2.0 Architecture," Dec. 2, 2005, pp. 1-32.
U.S. Non-final Office Action for U.S. Appl. No. 11/713,517 mailed Jun. 24, 2009.
U.S. Final Office Action for U.S. Appl. No. 11/713,517 mailed Dec. 4, 2009.
Hlasny, D., et al., "UPnP QoS Architecture:1.0, for UPuP Version 1.0," Mar. 10, 2005, 28 pages.
Song, A. et al., "UPnP QoS Architecture:2, for UPnP Version 1.0," Oct. 16, 2006, 33 pages.

(Continued)

*Primary Examiner* — Tarcza H. Thomas
*Assistant Examiner* — Maceeh Anwari
(74) *Attorney, Agent, or Firm* — Kenneth L. Sherman, Esq.; Michael Zarrabian, Esq.; Sherman & Zarrabian LLP

(57) ABSTRACT

A method and system for QoS control for remote access to UPnP devices, is disclosed. Enabling QoS control for remote access to UPnP devices involves providing a UPnP control point; providing a UPnP device in a network, wherein the first UPnP control point is connected to the network via a communication link; and providing access between the UPnP control point and the UPnP device by utilizing a UPnP proxy that examines UPnP messages in and out of the network and translates the local URL in the message to a URL that is accessible by the UPnP control point over the communication link.

21 Claims, 6 Drawing Sheets

(56) References Cited

OTHER PUBLICATIONS

"Universal Plug and Play," Wikipedia, http://en.wikipedia.org/wiki/universal plug and play, printed Jul. 25, 2008, 7 pages.

Fout, T., "Universal Plug and Play in Windows XP," Microsoft TechNet, published: Jul. 1, 2001, updated: Aug. 8, 2001, http://technet.microsoft.com/en-us/library/bb457049 (printed).aspx, 23 pages.

* cited by examiner

200

METHOD AND SYSTEM FOR QUALITY OF SERVICE CONTROL FOR REMOTE ACCESS TO UNIVERSAL PLUG AND PLAY

RELATED APPLICATION

This application claims priority from U.S. Provisional Patent Application Ser. No. 60/780,104 filed Mar. 7, 2006, incorporated herein by reference.

FIELD OF THE INVENTION

The present invention relates to remote access for universal plug and play (UPnP) devices.

BACKGROUND OF THE INVENTION

Universal Plug and Play (UPnP) is increasing in importance as a standard for private area networking such as home networking. UPnP, however, does not account for remote access to devices in a private area network over other networks such as the Internet or another private area network.

Due to the physical limitations of wire and wireless connectivity bandwidth, the UPnP forum has also defined the Quality of Service (QoS) architecture for UPnP as described in UPnP QoS Architecture 1:0, for UPnP Version 1.0, by Daryl Hlasny et al., Mar. 10, 2005, incorporated herein by reference. The QoS architecture is used to provide a network quality of service in a private area network such as a local area network, wherein streams flowing in the local area network can have different treatments based on the stream classification. There are two important services in UPnP QoS architecture. The first is a QoSManager for setting up a QoS parameter for a stream from a source device to a sink device, including any devices in the path of the stream. The UPnP QoSManager includes a QoSManager service and a QoS management. A QoSManager service is a standard UPnP service in terms of a control point issuing a control command to the QoSManager service, wherein the QoSManager service responds to the control request. The QoS management acts as a UPnP control point by issuing QoS related commands to the UPnP devices directly in order to reserve and manage the QoS for each device. A QoSDevice is a service that responds to the QoSManager's request for the device's QoS capabilities, current QoS status, etc.

The Internet enables devices to be connected essentially anywhere at anytime. Utilizing the Internet, users desire to access content/services in private networks such as a home network, and control devices and services in such networks from anywhere (e.g., remotely) and at anytime. There are two types of remote access. The first type involves a remote device directly connecting to the private network including a gateway, via a secured link (e.g., a VPN connection). The gateway can be configured such that the remote device that connects to the private network via the secured link becomes a part of the private network (e.g., the remote device is temporarily assigned a private IP address such that it can communicate with other devices in the network via UDP and/or TCP communication directly).

The second type of remote access is to allow devices in one private network to connect to devices in another private network via a secured link (e.g., VPN). This is typically achieved by setting up a secured link between gateways in the two networks such that a gateway that initializes the secured link is temporarily assigned a private IP address by the other gateway. As a result, a gateway in one network can reach any device in the other network. In both cases, if the secured link is configured in such a way such that every device in a network can be reached by other devices locally or remotely, the current UPnP QoS architecture suffices. In essence, if a QoSManager (residing on a local network or a remote network reachable via the secured link) is to setup a QoS path from a source device to a sink device (regardless of the location of the sink and/or source), as long as the devices are reachable by the QoSManager, the QoSManager can issue commands to the devices to find a path between them. For each device on the path (including the source device and the sink device), the QoSManager can obtain the QoS capability of each device and setup a QoS parameter for the entire path. If the stream flows over the secured link, the QoSManager knows that there is a point-to-point link between the devices at the ends of the stream. The QoSManager can set up the QoS parameters on the devices on both ends of the secured link. The QoS Device services on these devices pass the request to the layer 2 (L2) interface, and set up the QoS accordingly (e.g., MPLS QoS, IPSec QoS, and etc.).

In the case of remote access, security must also be considered. For example, if a homeowner's own mobile device establishes a secured link back to the homeowner's home network, the homeowner would desire to "see" and control all available devices in the home network. However, if a guest's mobile device establishes a secured link to a home network, the homeowner would desire to control what devices, services and contents can be "seen" or controlled by the guest. The same security concern applies to a home-to-home scenario, where a home gateway establishes a secured link to a remote home network, such that the remote home network's owner desires to control which devices, services and contents can be seen by the guest.

As such, for security reasons, requests for devices, services and contents must be screened before they reach targets. Further, responses from devices, services, and contents must be also screened before they reach requesters. However, if devices in a private network are directly reachable by a UPnP control point on the Internet and/or in another private network via a secured link, such screening function cannot be applied because the IP forwarding does not analyze the payload of IP packets.

Conventional UPnP QoS architecture suffice for remote accessing of a private network (e.g., a home network) if the secured link enables direct reachability of every device in the private network. However, such QoS architecture breaks down if security must be enforced, because the QoSManager cannot obtain QoS capabilities from the involved devices, and cannot set QoS parameters on the devices. There is, therefore, a need for a method and system for QoS control for access to UPnP devices. There is also a need for such a method and system to provide QoS control for secure access to UPnP devices.

BRIEF SUMMARY OF THE INVENTION

The present invention provides a method and system for QoS control for remote access to UPnP devices. Such a method and system coexists with conventional UPnP architectures, such that existing UPnP devices can function without modification.

In one example, a method for QoS control for remote access to UPnP devices, comprises the steps of: providing a UPnP control point; providing a UPnP device in a network, wherein the first UPnP control point is connected to the network via a communication link; and providing access between the UPnP control point and the UPnP device by utilizing a UPnP proxy that examines UPnP messages in and out of the network and translates the local URL in the message to a URL that is accessible by the UPnP control point over the communication link. The link can be a secured communication link.

In another example, a system for QoS control for remote access to UPnP devices, comprises: a UPnP control point; a UPnP device in a private network, the UPnP device including a QoS management agent, wherein the UPnP control point is configured to communicate with the network via a communication link; and a UPnP proxy configured to examine UPnP control and eventing messages in and out of the network, and intercept invocation messages to the QoS management agent, and further translate the local URL in the message to a URL that is accessible by the UPnP control point over the communication link; whereby the UPnP control point is further configured to accesses the UPnP device in the network over the communication link via the UPnP proxy.

These and other features, aspects and advantages of the present invention will become understood with reference to the following description, appended claims and accompanying figures.

DETAILED DESCRIPTION OF THE INVENTION

The present invention provides a method and system for QoS control for remote access to UPnP devices, with and without security enforcement, while coexisting with the conventional UPnP architecture such that existing UPnP devices can function without modification. As such, the present invention does not require changes to the UPnP QoS architecture.

In one embodiment, the present invention enables the existing UPnP QoS architecture to function in remote access cases, including, for example, when a UPnP control point on the Internet connects to a remote home network and when a UPnP control point in a private network (e.g., a home network) connects to a remote private network. Two example implementations of the present invention are described below.

Figure 1:
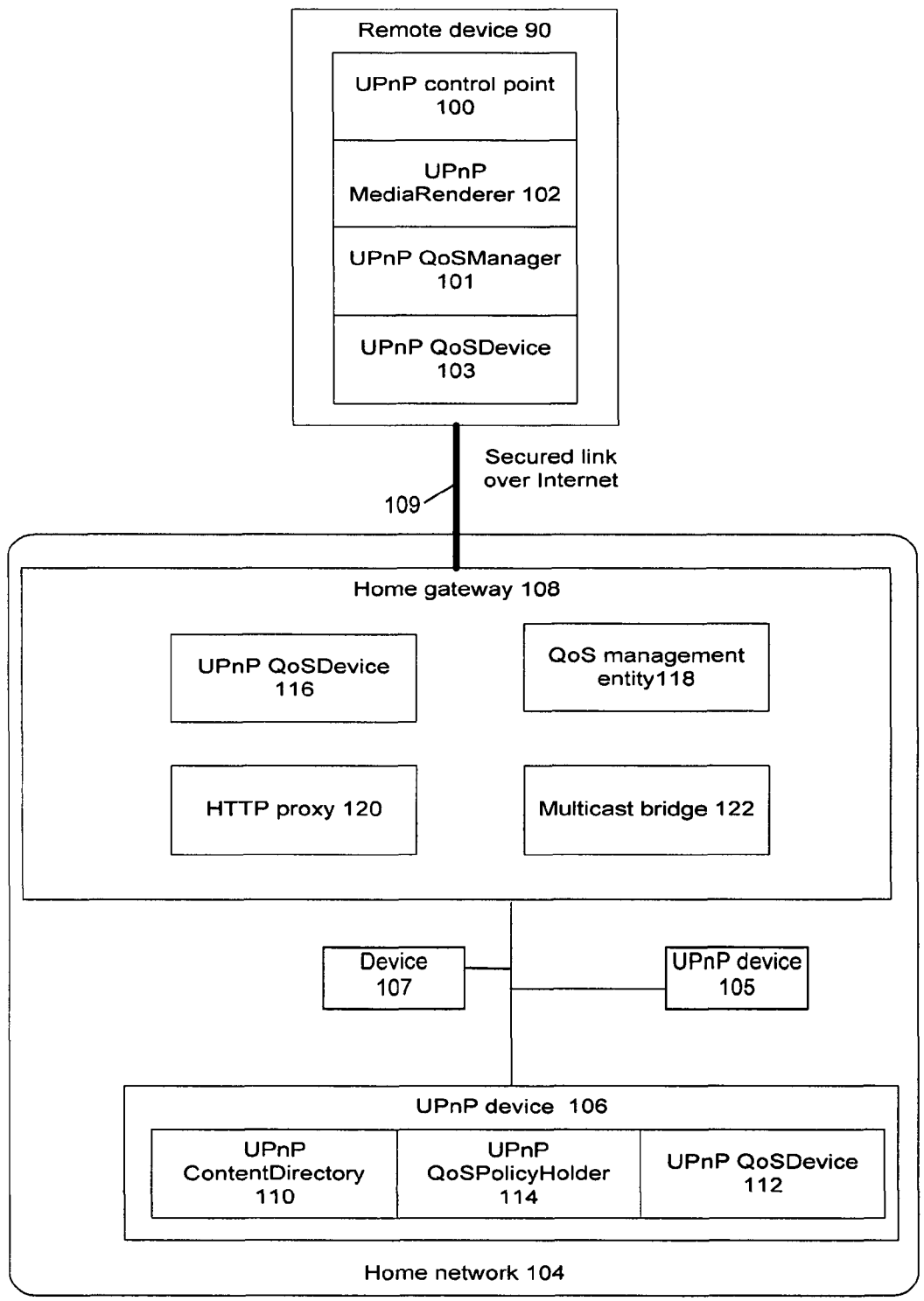
FIG. 1 shows a functional block diagram of an example system implementing a method for QoS control for remote access to UPnP devices, according to the present invention.

FIG. 1 shows a functional block diagram of an example system 10 implementing a process for QoS control for remote access to UPnP devices, according to the present invention. A UPnP control point 100 in a remote device 90 (e.g., a consumer electronic device, a PC, etc.) directly connects to a private network 104, such as a home network via a communication link 109, which may be a secured link (e.g., over the Internet). The control point 100 co-resides in the remote device 90 with a UPnP service such as a UPnP AV renderer service 102 (i.e., referred to as a two box model in UPnP AV), with a QoSDevice service 103 and with a QoSManager 101.

The network 104 includes at least one UPnP device 106 (e.g., a consumer electronic device, a PC, etc.) and a gateway 108. The UPnP device 106 includes a ContentDirectory service 110, a QoSDevice service 112 and a QoSPolicyHolder service 114. The network 104 can include other UPnP devices (e.g., UPnP device 105) and other devices (e.g., device 107). The network can implement a variety of networking protocols, such as Ethernet, 802.11x, etc.

The gateway 108 includes a UPnP QoSDevice 116, a QoS management entity 118, a HTTP proxy 120 and a multicast bridge 122. The QoS management entity 118 is a component defined in the UPnP QoS architecture, and acts as a UPnP control point that issues commands to QoSDevice services to QoSDevices 103, 112 and 116.

The HTTP proxy 120 allows for passage of HTTP messages between the secured link 109 and the network 104. The HTTP proxy 120 examines the HTTP messages in and out of the network 104 and translates the local URL in each message to a URL that is accessible by the control point 100 in the device 90 on the secured link. For example, if the ContentDirectory service 110 control URL is http://192.168.0.100/cds, the HTTP proxy translates it into http://172.124.0.1/192.168.0.100/cds, which can be accessed by the control point 100.

In addition, the HTTP proxy 120 provides special treatment for the HTTP messages that are intended for the QoSDevice 112. When the HTTP proxy 120 receives a message for the QoSDevice 112, the HTTP proxy 120 reroutes the message to the QoS management entity 118. After receiving the control commands from the HTTP proxy 120, the QoS management entity 118 issues the control commands to real (physical/destination) devices in the network 104, such as the UPnP device 106. The multicast bridge 122 forwards the UPnP multicast messages from the network 104 over the secured link. The QoS management entity 118 and the HTTP proxy 120 implement key aspects of this example embodiment, as described below.

Figure 2:
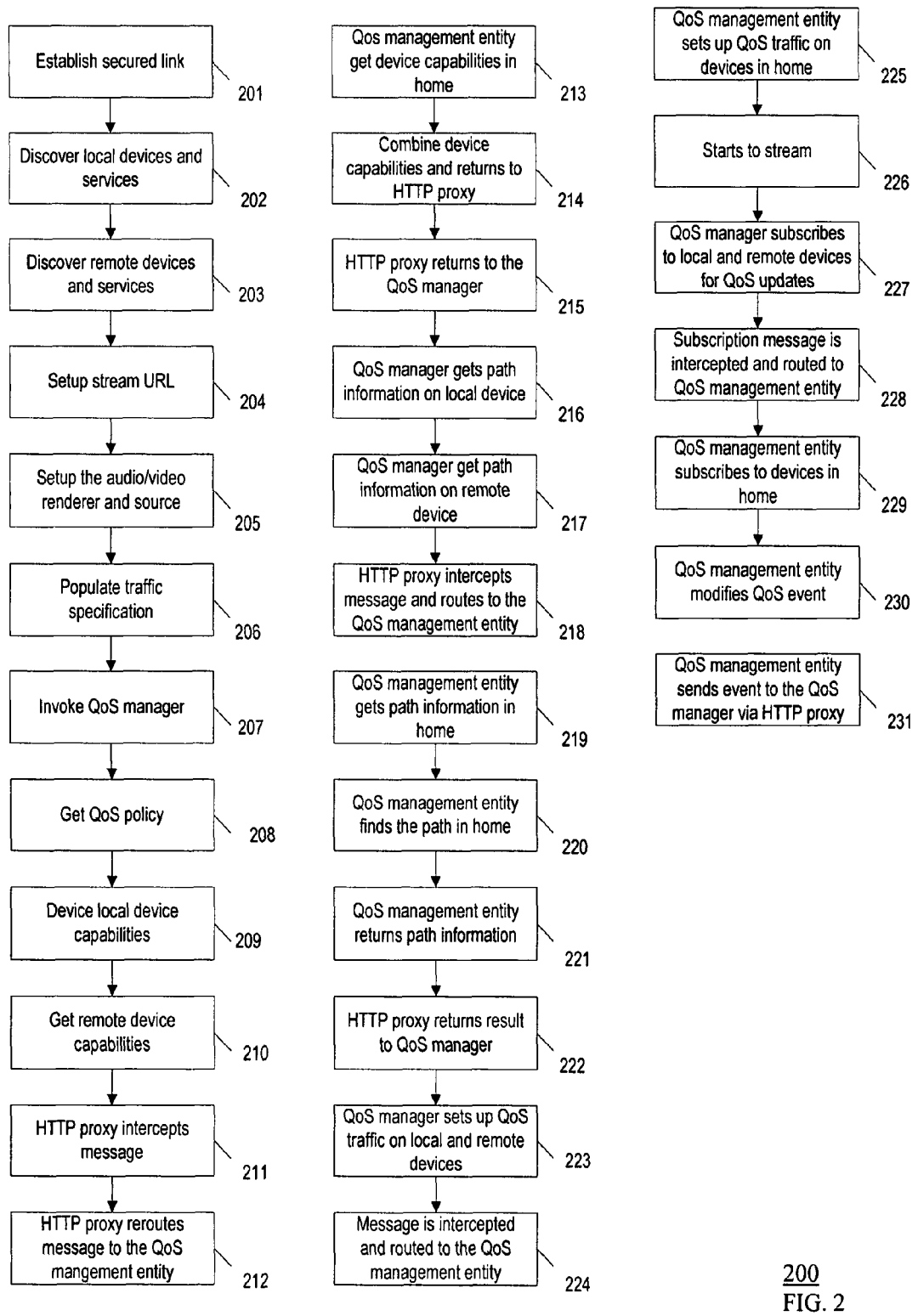
FIG. 2 shows a flowchart of the steps of an example process for QoS control for remote access to UPnP devices, implemented in the system of FIG. 1, according to the present invention.

FIG. 2 shows a flowchart of an example process 200 for QoS control for remote access to UPnP devices, implemented in the system 10 of FIG. 1, according to the present invention, including the steps of:

Step 201: To access the network 104, the remote device 90 first establishes a secured link to the gateway 108.

Step 202: The control point 100 discovers the UPnP MediaRenderer 102, the UPnP QoSManager 101, and the UPnP QoSDevice 103 in the device 90.

Step 203: Through the HTTP proxy 120 and the multicast bridge 122, the control point 100 also discovers the UPnP Device 106, the UPnP ContentDirectory 110, the UPnP QoSPolicyHolder 114 and the UPnP QoSDevice 112. The UPnP control point 100 may also discover devices 105 and 107.

Step 204: The control point 100 now desires, for example, to stream a media content from the UPnP ContentDirectory 110 in the network 104 to the UPnP MediaRenderer 102 in the device 90 over the link.

Step 205: The control point 100 informs the UPnP MediaRenderer 102 of the stream by invoking a UPnP "SetAVTransportUri" action on the renderer 102. The stream URL is provided by the ContentDirectory 110 and is translated by the HTTP proxy 120 such that the UPnP MediaRenderer 102 can access that content. For example, the original URL can be http://192.168.0.1/cds/clip.avi, and the translated URL can be http://172.124.0.1/192.168.0.1/cds/clip.avi.

Step 206: The control point 100 provides the IP address and port number of the UPnP MediaRenderer 102 as a target address and target port, respectively, into a traffic specification (TSPEC). A TSPEC in the aforementioned QoS architecture includes a set of parameters that define the characteristics of the traffic stream. A traffic stream is a unidirectional flow of data that originates at a source device and terminates at one or more sink device(s). The control point 100 also inputs the IP address of the gateway 108 on the secured link as the source address because from the point of view of the control point 100, the ContentDirectory service 110 originates from the IP address of the gateway 108.

Step 207: The control point 100 calls (commands/messages/communicates with) the UPnP QoSManager 101 to set up a QoS for the stream.

Step 208: The UPnP QoSManager 101 sends a message to the UPnP QoSPolicyHolder 114 for the TSPEC for the stream. The message is intercepted by the HTTP proxy 120 and forwarded to the QoSPolicyHolder 114.

Step 209: The QoSManager 101 obtains device QoS capabilities from the UPnP QoSDevice 103.

Step 210: The QoSManager 101 also sends an invocation message to the UPnP QoSDevice 112, to obtain device QoS capabilities from the UPnP QoSDevice 112.

Step 211: The invocation message is intercepted by the HTTP proxy 120.

Step 212: The HTTP proxy 120 reroutes the invocation message to the QoS management entity/agent 118.

Step 213: The QoS management entity 118 obtains the QoS device QoS capabilities from both the UPnP QoSDevice 112 and the UPnP QoSDevice 116.

Step 214: The QoS management entity 118 combines the results from the QoSDevices 112 and 116 and returns the results back to the HTTP proxy 120.

Step 215: The HTTP proxy 120 returns those results back to the QoSManager 101.

Step 216: The QoSManager 101 invokes a UPnP QoS "GetPathInformation" action message on the UPnP QoSDevice 103, and discovers that the gateway 108 is on the path between the remote device 90 and the UPnP device 106.

Step 217: The QoSManager 101 sends a "GetPathInformation" invocation action message on the UPnP QoSDevice 112.

Step 218: The "GetPathInformation" invocation message is intercepted by the HTTP proxy 120 and is rerouted to the QoS management entity 118.

Step 219: The QoS management entity 118 invokes a "GetPathInformation" message on the UPnP QoSDevice 112, and obtains the result of the path information from the UPnP QoSDevice 112 that is at a next hop.

Step 220: The QoS management entity 118 further finds the path between the gateway 108 and the UPnP device 106.

Step 221: The QoS management entity 118 returns the network path information for the secured link on the gateway 108 back to the HTTP proxy 120.

Step 222: The HTTP proxy 120 returns the result back to the QoSManager 101.

Step 223: The QoSManager 101 invokes a UPnP QoS "SetupTrafficQoS" action message (call) on the UPnP QoSDevice entities 103, 116, and 112.

Step 224: The "SetupTrafficQoS" action message to the UPnP QoSDevice 112 is intercepted by the HTTP proxy 120 and is rerouted to the QoS management entity 118.

Step 225: The QoS management entity 118 invokes a "SetupTrafficQoS" action message on the UPnP QoSDevice entities 112 and 116.

Step 226: QoS is now setup and the control point 100 can start to stream a media content item from the UPnP ContentDirectory service 110 in the network 104 to the UPnP Media-Renderer 102 in the remote device 90 over the secured link.

Step 227: The QoSManager 101 subscribes to the UPnP QoSDevice entities 103, 116 and 112 to obtain the updated QoS information.

Step 228: The subscription message is intercepted by the HTTP proxy 120 and is rerouted to the QoS management entity 118.

Step 229: The QoS management entity 118 subscribes to the UPnP QoSDevice entities 112 and 116 for QoS updates.

Step 230: When a QoS update event comes into the QoS management entity 118 and the QoS management entity 118 modifies the event such that the path information includes the network interface that is associated with the secured link only on the gateway 108.

Step 231: The QoS management entity 118 sends the modified event to the HTTP proxy 120, wherein the HTTP proxy 120 forwards the modified event to the QoSManager 101.

An alternative to the examples in FIGS. 1-2 is where the control point in the remote device does not include a QoSManager service, but the private network that the control point connects to includes a QoSManager service. In this case, the control point in the remote device can utilize the QoSManager in the private network for QoS setup. The message to the QoSManager in the private network is first intercepted by the HTTP proxy and is routed to the QoS management entity in the private network gateway. The QoS management entity performs the QoS setup and monitoring instead of the real QoSManager in the private network. This process does not require a mobile/remote device to include a QoSManager service, and can utilize an existing QoSManager in a private network that the device connects to.

Figure 3:
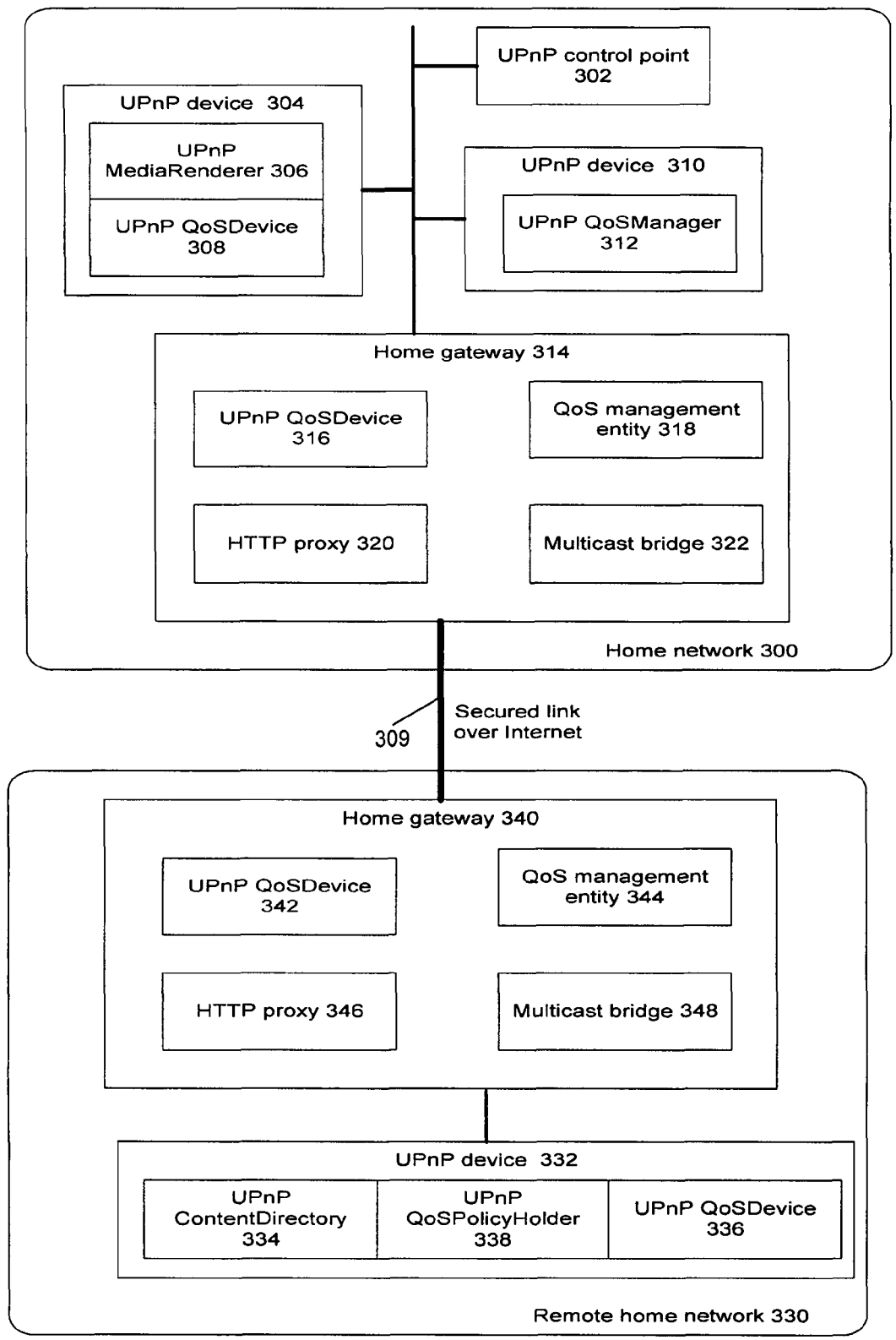
FIG. 3 shows a functional block diagram of another example system implementing another method for QoS control for remote access to UPnP devices, according to the present invention.

FIG. 3 shows a functional block diagram of another example system 20 implementing QoS control for remote access to UPnP devices, according to the present invention. The system 20 provides QoS operation in a remote access scenario where a control point 302 in a first (local) private network 300 connects to a second (remote) private network 330 via a communication link 309, which may be a secured link (e.g., over the Internet, RF, cell towers, etc.).

The first network 300 further includes a gateway 314, at least one UPnP device 304 which includes a UPnP MediaRenderer service 306, a UPnP QoSDevice 308 and a UPnP device 310 including a UPnP QoSManager 312. The gateway 314 includes a UPnP QoSDevice 316, a QoS management entity 318, a HTTP proxy 320, and a multicast bridge 322. The devices in the first network 300 are networked using a variety of networking technologies, such as Ethernet, 802.11x, etc.

The second network 330 includes at least one UPnP device 332 and a gateway 340. The UPnP device 332 includes a ContentDirectory service 334, a UPnP QoSDevice 336 and a UPnP PolicyHolder 338. The gateway 340 includes a UPnP QoSDevice 342, a QoS management entity 344, a HTTP proxy 346 and a multicast bridge 348. Each of the QoS management entities 312 and 344 can act as a control point that can issue commands to the QoSDevices and subscribe to the QoSDevices for QoS related events. The HTTP proxy 320 and the HTTP proxy 346 process HTTP messages by translating URLs such that the devices in the first network 300 can retrieve HTTP messages from and send HTTP messages to, devices in the second network 330 and vice versa.

The multicast bridges 322 and 348 allow UPnP multicast messages to pass between the first network 300 and the second network 330. During the multicast forwarding, each multicast bridge modifies messages to include URLs that point to its respective HTTP proxy. The fact that the control point 302 and the MediaRenderer 306 reside on different devices is referred to as a three box model in UPnP AV architecture. The modules 318, 320, 344 and 346 implement key aspects of this example embodiment, as described below.

Figure 4:
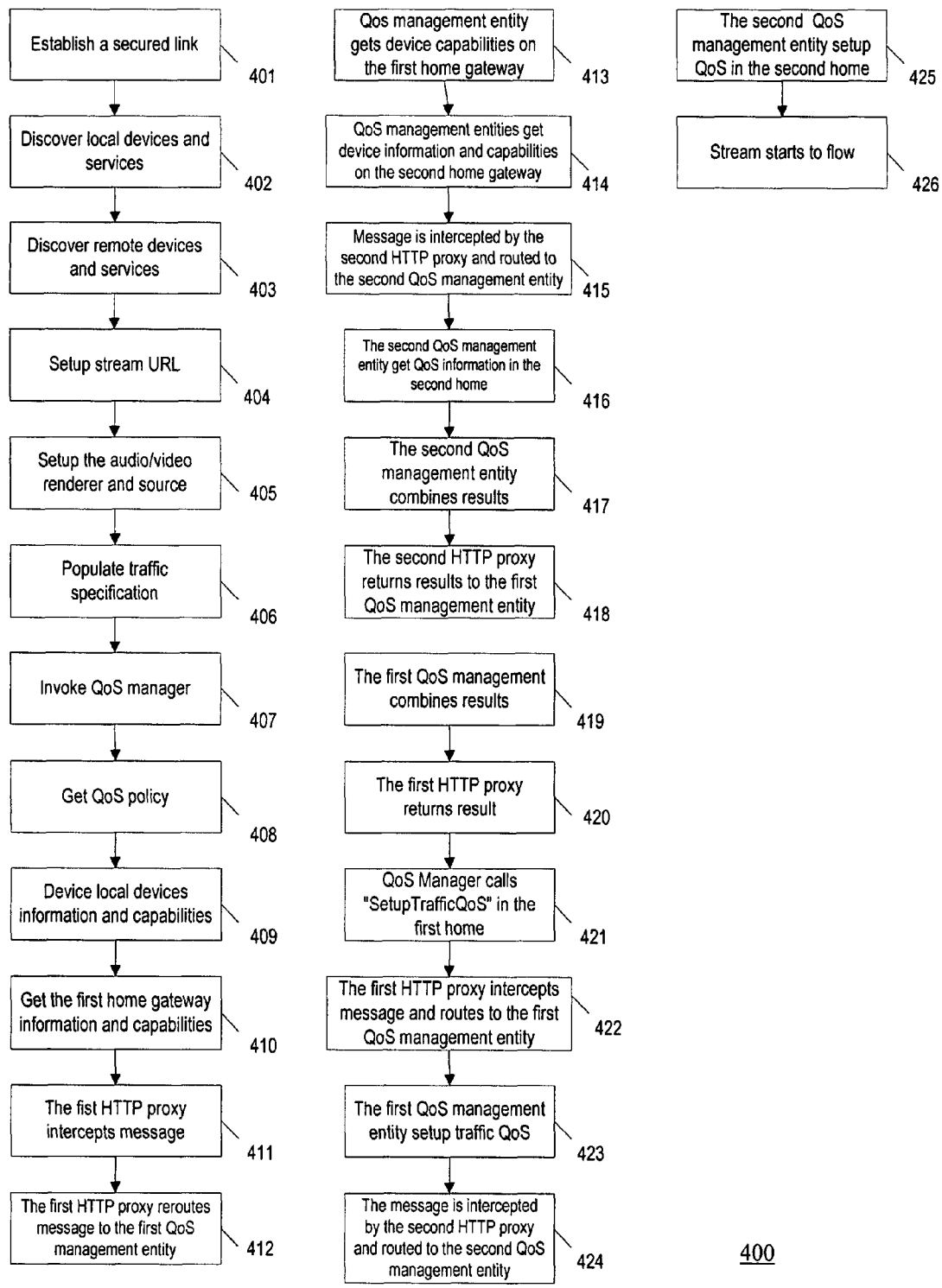
FIG. 4 shows a flowchart of the steps of a process for QoS control for remote access to UPnP devices, implemented in the system of FIG. 3, according to the present invention.

FIG. 4 shows a flowchart of an example process 400 for QoS control for remote access to UPnP devices, implemented in the system 20 of FIG. 3, according to the present invention, including the steps of:

Step 401: To access the second network 330, the gateway 314 in the first network 300 establishes a secured link to the gateway 340.

Step 402: The UPnP control point 302 discovers the UPnP MediaRenderer 306, the UPnP QoSManager 312 and the UPnP QoSDevice 308. The control point 302 further discovers the gateway 314 including the services of a UPnP QoSDevice 316, a QoS management entity 318, a HTTP proxy 320 and a multicast bridge 322.

Step 403: Through the HTTP proxies 320, 346 and the multicast bridges 322 and 348, the UPnP control point 302 also discovers a UPnP Device 332, a UPnP ContentDirectory 334, a UPnP QoSPolicyHolder 338 and a UPnP QoSDevice 336.

Step 404: The control point 302 then desires to stream a media content item from the UPnP ContentDirectory 334 in the second network 330 to the UPnP MediaRenderer 306 in the first network 300.

Step 405: The control point 302 informs the UPnP MediaRenderer 306 of the stream by invoking a "SetAVTransportUri" action message on the renderer 306. The stream URL is obtained from the ContentDirectory 334 and is translated by two HTTP proxies 346 and 320, such that the UPnP media renderer 306 can access the URL. For example, the original URL can be http://192.168.0.1/cds/clip.avi, and the translated URL by the HTTP proxy 346 can be http://192.168.3.1/192.168.0.1/cds/clip.avi. This URL is further translated by the HTTP proxy 320 into http://172.124.0.1/192.168.3.1/192.168.0.1/cds/avi.

Step 406: The control point 302 places the IP address of the UPnP media renderer 306 as the target address into a traffic specification. The control point 302 also inputs the IP address of the gateway 314 on the secured link network interface as the source address because from the point of view of the control point 302, wherein the ContentDirectory 334 service is provided by the gateway 314.

Step 407: The control point 302 calls/messages the UPnP QoSManager 312 to set up a QoS for the stream.

Step 408: The QoSManager 312 first contacts the UPnP QoSPolicyHolder 338 for the traffic specification for the stream through the HTTP proxies 320 and 346.

Step 409: The QoSManager 312 obtains the device information and capabilities from the UPnP QoSDevice 308.

Step 410: The QoSManager 312 also invokes an action message to obtain device information and device capabilities from the QoSDevice 316.

Step 411: The invocation message is intercepted by the HTTP proxy 320.

Step 412: The HTTP proxy 320 reroutes the invocation message to the QoS management entity 318.

Step 413: The QoS management entity 318 obtains the QoS device information and capabilities from the UPnP QoSDevice 316.

Step 414: The QoS management entity 318 further invokes an action message to obtain the QoS device information and capabilities from the UPnP QoSDevice 342, because from the point of view of the QoS management entity 318, the ContentDirectory service 334 originates from the gateway 340.

Step 415: The invocation message from the QoS management entity 318 is intercepted by the HTTP proxy 346 and rerouted to the QoS management entity 344.

Step 416: The QoS management entity 344 obtains the device information from the UPnP QoSDevice 342 and from the UPnP QoSDevice 336.

Step 417: The QoS management entity 344 combines the results from the QoSDevices 342 and 336 and returns the combined result back to the HTTP proxy 346. In the combined result, the target port provides the port number from the UPnP QoSDevice 342.

Step 418: The HTTP proxy 346 returns results back to the QoS management entity 318.

Step 419: The QoS management entity 318 combines the results from the UPnP QoSDevice 316 and from the HTTP proxy 346 and returns results back to the HTTP proxy 320. In the combined result, the target port includes the port number from the UPnP QoSDevice 316.

Step 420: The HTTP proxy 318 returns the combined result back to the QoSManager 312.

Step 421: Because from the point of view of the QoSManager 312, the stream starts from the gateway 314 and stops at the UPnP device 304, there is no other devices in the path, whereby the QoSManager 312 invokes a "SetupTrafficQoS" action message on the UPnP QoSDevices entities 308 and 316.

Step 422: The action message to the UPnP QoSDevice 316 is intercepted by the HTTP proxy 320 and is rerouted to the QoS management entity 318.

Step 423: The QoS management entity 318 invokes a "SetupTrafficQoS" action message on the UPnP QoSDevice 316 and 342.

Step 424: The action message to the UPnP QoSDevice 342 is intercepted by the HTTP proxy 346 and is rerouted to the QoS management entity 344.

Step 425: The QoS management entity 344 invokes a "SetupTrafficQoS" action message on the UPnP QoSDevice 342 and the UPnP QoSDevice 336.

Step 426: QoS is now setup and the control point 302 can now start to stream a media item from the UPnP ContentDirectory 334 to the UPnP MediaRenderer 306.

An alternative to the examples in FIGS. 3-4 is where the QoSManager does not reside in the first private network. Instead, the QoSManager resides in the second private network. The multicast bridges in the gateways of the first and second networks enable the QoSManager to be reachable by the control point in the first network such that the control point can use the QoSManager for QoS purposes. The QoS SEND action messages (calls) to the QoSManager in the second network are intercepted by both HTTP proxies in the gateways of the first and second networks, respectively, and are routed to the QoS management entities on these gateways for action QoS setup and monitoring. As such, a first private network need not have QoS services, but can use remote QoS services in other networks.

The method and system of the present invention co-exist with existing UPnP architecture without imposing changes to the architecture, but with the flexibility to incorporate security measures for remote home access. For example, when a QoS manager and/or the QoS management entity receives a QoS request, access rights are checked (possibly through an access control module) with respect to the content, devices and services the requester of the device/content/service has. If the requester does not have access to all of the necessary devices/content/services along the path, and there is no alternative path on which the requester can have access, the request will be rejected. Only when the manager/management entity can find a path along which all required devices/services/content are accessible to the requester, will that entity proceed to set up the QoS for the devices/services/content (e.g., stream).

As such, in one example, the present invention provides a gateway in a private networks that includes a UPnP QoSDevice entity, a QoS management agent, a UPnP proxy and a UPnP discovery bridge, which allow a remote control point to establish a secure communication link between the private network and the control point, and further enables a QoS setup between a remote sink device and a source device in a private network via a secure link. In another example, the present invention provides a gateway in a private network that includes a UPnP QoSDevice entity, a QoS management agent, a UPnP proxy and a UPnP discovery bridge, which allow a remote control point to establish a secure communication link with a private network, and further enables a QoS setup between a remote sink device and a source device in the private network via the secure link.

The present invention enables a QoS control for remote access to UPnP devices, such remote access can be with and without security enforcement. Therefore, although the examples hereinabove utilize a secure link, such is not required. For example, in FIG. 1, the communication link 109 between the remote device 90 and the private network 104 need not be a secured link. Further, in FIG. 3, the communication link 309 between the two networks 300 and 330 need not be a secured link.

Figure 5:
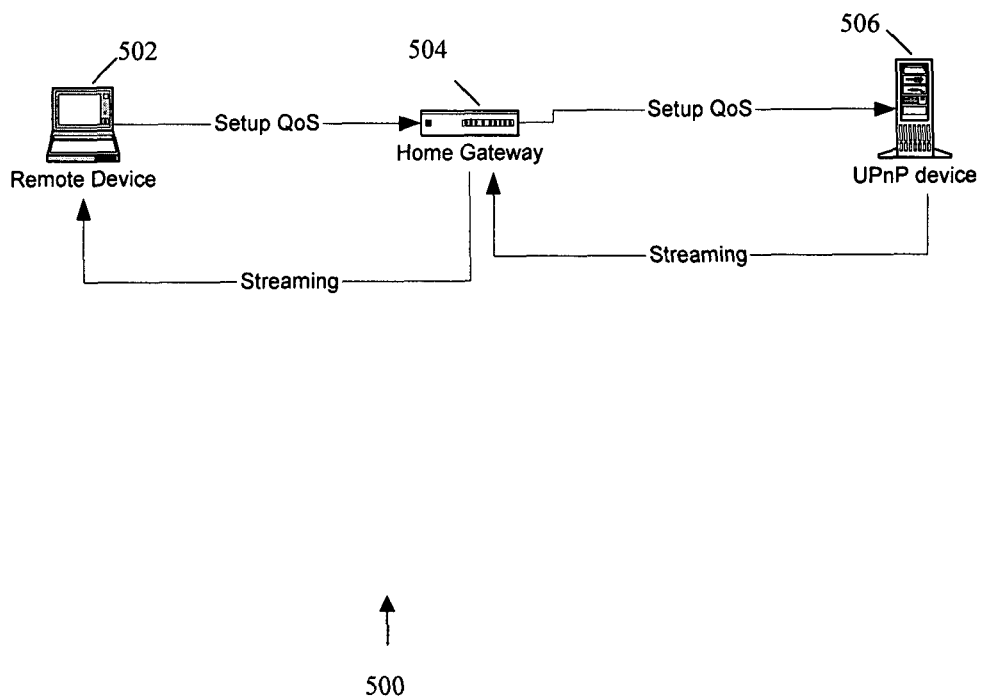
FIG. 5 shows a functional block diagram of a system for providing access from a remote UPnP device including a UPnP control point, to a UPnP device in a private network via a gateway in the network, according to an embodiment of the present invention.
Figure 6:
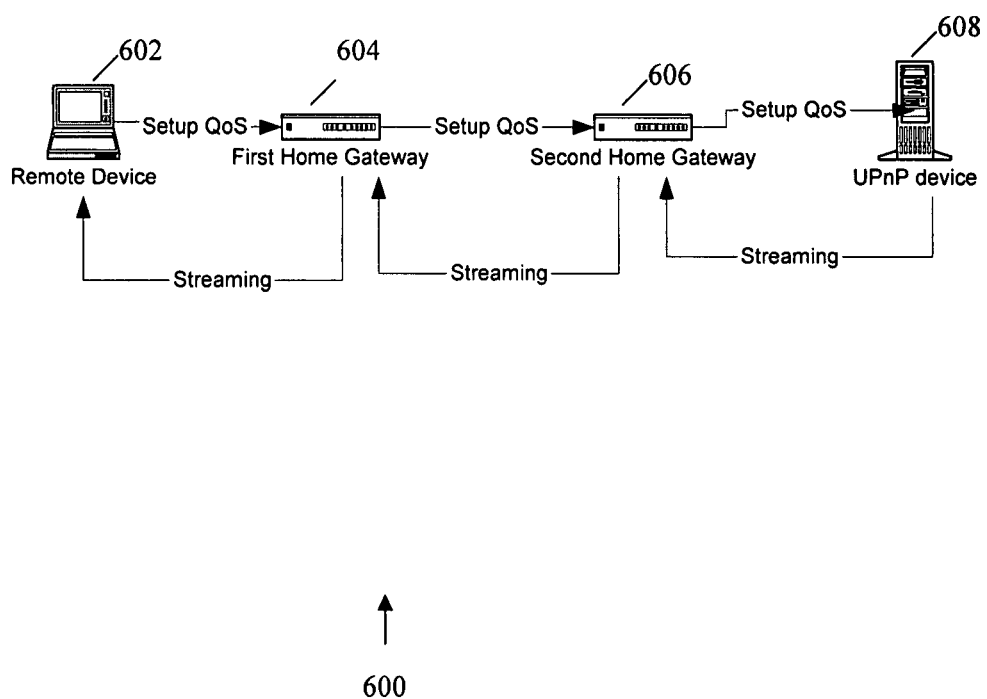
FIG. 6 shows a functional block diagram of a system for providing access from a first UPnP device, including a UPnP network, in a first network, to a second UPnP device in a second network via a first gateway in the first network and a second gateway in the second network, according to an embodiment of the present invention.

FIG. 5 shows a functional block diagram of an example system 500 for providing access from a remote UPnP device 502 including a UPnP control point, to a UPnP device 506 in a private network via a gateway 504 in the network, as described. FIG. 6 shows a functional block diagram of another example system 600 for providing access from a first UPnP device 602, including a UPnP network, in a first network, to a second UPnP device 608 in a second network via a first gateway 604 in the first network and a second gateway 606 in the second network, as described.

As is known to those skilled in the art, the aforementioned example architectures described above, according to the present invention, can be implemented in many ways, such as program instructions for execution by a processor, as logic circuits, as an application specific integrated circuit, as firmware, etc.

The present invention has been described in considerable detail with reference to certain preferred versions thereof; however, other versions are possible. Therefore, the spirit and scope of the appended claims should not be limited to the description of the preferred versions contained herein.

What is claimed is:

1. A system for Quality of Service (QoS) control for remote access to universal plug and play (UPnP) devices, comprising:
   a remote electronic device including a UPnP control point;
   a gateway in a private network, the gateway comprising a QoS management agent and a proxy; and
   a UPnP electronic device in the private network, the UPnP electronic device coupled to the QoS management agent, the proxy examines UPnP control and eventing messages in and out of the private network, and intercepts invocation messages to the QoS management agent, and further translates a local URL in the message to a URL that is accessible by the UPnP control point over the communication link;
   the proxy and the QoS management agent further establish a QoS path from the UPnP electronic device to the gateway internally in the private network, and not visible out of the private network, and the proxy reroutes messages intended for the UPnP electronic device in the QoS management agent, wherein the QoS management agent in turn issues messages to the UPnP electronic device,
   wherein the UPnP control point further establishes a communication link with the gateway via the proxy and access the UPnP electronic device in the private network over the communication link via the proxy.

2. The system of claim 1 wherein:
   the gateway further comprising a UPnP QoSDevice and a UPnP discovery bridge that forwards UPnP SSDP multicast messages in the private network over the communication link; and
   the UPnP control point establishes a communication link with the gateway via the proxy.

3. The system of claim 2 wherein:
   the UPnP control point is a component of a remote UPnP device, the remote UPnP device further including UPnP services and UPnP functions, wherein the UPnP functions include a UPnP QoSManager and a UPnP QoSDevice; and
   the UPnP control point establishes a communication link with the gateway in the private network, and thereafter discovers UPnP services and UPnP QoS functions of the remote UPnP device.

4. The system of claim 3 wherein the UPnP control point discovers the UPnP device in the private network via the proxy and UPnP discovery bridge in the gateway, wherein the proxy is a UPnP proxy.

5. The system of claim 4 wherein the UPnP control point accesses the UPnP device in the private network via the UPnP proxy and the UPnP discovery bridge in the gateway.

6. The system of claim 4 wherein:
   the UPnP device in the private network includes a UPnP ContentDirectory, a UPnP QoSPolicyHolder and a UPnP QoSDevice; and
   the UPnP control point discovers the UPnP ContentDirectory, the UPnP QoSPolicyHolder and the UPnP QoSDevice of the UPnP device in the private network via the UPnP proxy and the UPnP discovery bridge in the gateway.

7. The system of claim 6 wherein the UPnP control point accesses the UPnP device in the private network for streaming content to a UPnP service in the remote UPnP device.

8. The system of claim 7 wherein:
the UPnP control point provides an IP address and a port number of the UPnP service as a target address and target port, respectively, in a QoS traffic specification; and
the UPnP control point inputs an IP address of the gateway on the communication link as the stream source address.

9. The system of claim 8 wherein:
the UPnP control point calls the UPnP QoSManager to set up a QoS for the stream;
the UPnP QoSManager accesses the UPnP QoSPolicyHolder for a traffic specification for the stream;
the QoSManager further obtains device QoS capabilities from the UPnP QoSDevice of the remote UPnP device; and
the QoSManager further generates an invocation message to obtain device QoS capabilities from the UPnP QoSDevice of the UPnP device in the private network.

10. The system of claim 9 wherein the UPnP proxy intercepts said invocation message and reroute the call to the QoS management agent.

11. The system of claim 10 wherein:
the QoS management agent further obtains the QoSDevice QoS capabilities from both the remote UPnP QoSDevice and the UPnP QoSDevice in the private network;
the QoS management agent further combines the results from said QoSDevices and return results back to the UPnP proxy; and
the UPnP proxy further returns said results back to the QoSManager to invoke a GetPathInformation action message on the UPnP QoSDevice of the remote UPnP device and discovers a gateway that is on the path between the remote UPnP device and the UPnP device in the private network.

12. The system of claim 11 wherein:
the communication link is a secured link;
the QoSManager further invokes a GetPathInformation action message on the UPnP QoSDevice in the UPnP device in the private network, and the UPnP proxy intercepts and reroutes that action message to the QoS management agent;
the QoS management agent further invokes a GetPathInformation action message on the UPnP QoSDevice of the UPnP device in the private network and finds the path between the gateway and the UPnP device in the private network, such that the QoS management agent returns the private network path information results for the secured link on the gateway back to the UPnP proxy;
the UPnP proxy further returns the private network path information results back to the QoSManager and invokes a SetupTrafficQoS message on the UPnP QoSDevices for the gateway, on the remote UPnP device and on the UPnP device in the private network;
such that the UPnP proxy intercepts the SetupTrafficQoS invocation message to the UPnP QoSDevice of the UPnP device in the private network and reroutes the SetupTrafficQoS invocation message to the QoS management agent; and
the QoS management agent further invokes a SetupTrafficQoS message on the UPnP QoSDevice of the gateway and on the remote UPnP device, wherein QoS is setup such that the UPnP control point begins streaming content from the UPnP ContentDirectory of the UPnP in the network to the UPnP service of the remote UPnP device.

13. The system of claim 12 wherein:
the QoSManager further subscribes to the UPnP QoSDevice of the remote UPnP device, to the gateway and to the UPnP device in the private network, and obtains updated QoS information;
the UPnP proxy further intercepts the subscription message and reroutes it to the QoS management agent which subscribes to the UPnP QoSDevice of the gateway and the UPnP device in the private network for QoS updates;
upon a QoS update event, the QoS management agent modifies the event wherein the private network path information include network interface information associated with the communication link for the gateway; and
the QoS management agent further sends the modified event to the UPnP proxy of the UPnP device in the private network to forward to the QoSManager.

14. A method for Quality of Service (QoS) control for remote access to universal plug and play (UPnP) devices, comprising:
providing a UPnP control point;
a gateway in a private network, the gateway comprising a QoS management agent and a proxy; and
providing a UPnP device in the private network, wherein the UPnP control point is connected to the private network via a communication link;
providing access between the UPnP control point and the UPnP device by utilizing a proxy that examines UPnP messages in and out of the private network and translates the local URL in the message to a URL that is accessible by the UPnP control point over the communication link;
the proxy and the QoS management agent establish a QoS path from the UPnP device to the gateway internally in the private network, and not visible out of the private network, and the proxy reroutes messages intended for the UPnP device to the QoS management agent, wherein the QoS management agent in turn issues messages to the UPnP electronic device.

15. The method of claim 14 wherein:
the UPnP device includes a UPnP QoSDevice;
the method further comprising, when receiving a message for the QoSDevice, the UPnP proxy rerouting the message to the QoS management agent in the private network with control commands.

16. The method of claim 15 further comprising:
upon receiving the control commands from the proxy, the QoS management agent issuing the control commands to the intended UPnP device in the private network.

17. The method of claim 16 further comprising:
providing a UPnP discovery bridge for forwarding UPnP SSDP messages in the private network over the communication link.

18. An apparatus for access to electronic universal plug and play (UPnP) devices comprising:
a gateway including:
a UPnP QoSDevice;
a QoS management agent;
a UPnP proxy; and
a UPnP discovery bridge,
wherein the gateway providing access from a remote electronic device including a UPnP control point in a private network by establishing a secured communication link between the gateway and the UPnP control point via the UPnP proxy; wherein the UPnP proxy and the QoS management agent establish a QoS path from a UPnP electronic device in a local network to the gateway internally in the private network, and not visible out of the private network, and the UPnP proxy reroutes messages intended for the UPnP electronic device to the QoS management agent, and the QoS management agent in turn issues messages to the UPnP electronic device, wherein the UPnP proxy examines UPnP control and eventing messages in and out of the private network, and intercepts invocation messages to the QoS management agent, and further translates a local URL in each UPnP message to a URL that is accessible by the UPnP control point over the secured communication link.

19. The apparatus of claim 18 wherein the gateway provides QoS setup between a remote sink device connected to the UPnP control point and a source device connected to the gateway.

20. An apparatus for access to universal plug and play (UPnP) devices in a network, comprising:
 a UPnP QoSDevice, a QoS management agent, a UPnP proxy and a UPnP discovery bridge that provide access from a remote electronic device including a UPnP control point by establishing a secured communication link between a gateway and the UPnP control point, wherein the UPnP proxy and the QoS management agent establish a QoS path from the remote electronic device to the gateway internally in a private network, and not visible out of the private network, and the UPnP proxy reroutes messages intended for the remote device to the QoS management agent, wherein the QoS management agent in turn issues messages to the remote electronic device, wherein the gateway forwards UPnP SSDP multicast messages in the network over the secured communication link, the UPnP control point establishes the secured communication link with the gateway via the UPnP proxy that examines UPnP messages in and out of the private network, and the UPnP proxy translates a local URL in each UPnP message to a URL that is accessible by the UPnP control point over the secured communication link.

21. The apparatus of claim 18, wherein the UPnP proxy translates a local URL in a message to a URL that is accessible by the UPnP control point over the secured link.

* * * * *